United States Patent
De Oliveira

(12) 
(10) Patent No.: US 6,763,004 B1
(45) Date of Patent: Jul. 13, 2004

(54) SYSTEM AND METHOD FOR PAGING MOBILE STATIONS IN A RADIO TELECOMMUNICATIONS NETWORK

(75) Inventor: Fernando De Oliveira, St-Laurent (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 833 days.

(21) Appl. No.: 09/671,457
(22) Filed: Sep. 27, 2000
(51) Int. Cl.⁷ .................................................. H04J 3/24
(52) U.S. Cl. ...................... 370/312; 370/390; 455/458
(58) Field of Search ............................... 455/560, 561, 455/426.1, 458, 567, 435.1, 433; 370/328, 338, 390, 400, 401, 432, 312, 313, 314, 389; 340/7.46

(56) References Cited

FOREIGN PATENT DOCUMENTS

WO    WO 99/01991    1/1999

*Primary Examiner*—Wellington Chin
*Assistant Examiner*—Mark A Mais
(74) *Attorney, Agent, or Firm*—Smith, Danamraj & Youst

(57) ABSTRACT

A system and method of paging mobile stations in a cellular telecommunications network that reduces signaling traffic by reducing the number of page messages sent from a Mobile Switching Center (MSC) to Base Stations (BSs) in the network. The MSC sends a single Internet Protocol (IP) broadcast page message over an IP network to which the BSs are connected. User Datagram Protocol (UDP) ports in each BSs are dedicated to listening for IP broadcast page messages directed to a given BS's associated location area, location area group, or the network service area.

17 Claims, 3 Drawing Sheets

SYSTEM AND METHOD FOR PAGING MOBILE STATIONS IN A RADIO TELECOMMUNICATIONS NETWORK

BACKGROUND OF THE INVENTION

1. Technical Field of the Invention

This invention relates to radio telecommunication systems and, more particularly, to a system and method for paging Mobile Stations (MSs) that minimizes the signaling load between Mobile Switching Centers (MSCs) and Base Stations (BSs) in a radio telecommunications network.

2. Description of Related Art

When a call for a particular MS is received in a typical cellular radio telecommunications network, the MSC receiving the call interrogates the serving MSC where the MS was last known to be operating for a routing number. The serving MSC then sends a page message to each BS in its service area that is to page the MS. In a typical paging scenario, the MS is first paged in a "location area" which is a plurality of cells surrounding the last known location of the MS. If the MS is not found in the location area, the search is expanded to a "location area group" which is a plurality of location areas. Finally, if the MS is not found there, the MS is paged throughout the entire "service area" of the network. Each level of paging requires a plurality of page messages to be generated and sent to the plurality of BSs that are to page the MS. Clearly, as the search broadens to the location area group or the service area, a large number of page messages are typically generated. For example, when paging the service area of a typical exchange, 400 or more page messages may be required. This can be a heavy burden on the processing capacity of the MSC and on the signaling capacity of the network. This signaling burden becomes even more of a problem when it is considered that, at any given moment, the network may be paging for a plurality of MSs.

In order to overcome the disadvantage of existing solutions, it would be advantageous to have an improved system and method for transmitting page messages from MSCs to BSs in a cellular network that eliminates the heavy signaling burden currently experienced. The present invention provides such a system and method.

SUMMARY OF THE INVENTION

In one aspect, the present invention is a method of paging mobile stations in a cellular telecommunications network having a Mobile Switching Center (MSC), a plurality of Base Stations (BSs) in a network service area, and an Internet Protocol (IP) network connecting the BSs to the MSC. The method includes the steps of assigning a common IP broadcast address to all of the BSs in the service area, broadcasting an IP page message to the common IP broadcast address, and dedicating at least one User Datagram Protocol (UDP) port in each of the BSs to receive the page message from the MSC. The step of dedicating at least one UDP port may include dedicating a first UDP port to receive page messages directed to a location area with which the BS is associated, dedicating a second UDP port to receive page messages directed to a location area group with which the BS is associated, and dedicating a third UDP port to receive page messages directed to the network service area.

In another aspect, the present invention is a system for paging mobile stations in a cellular telecommunications network having an MSC serving a network service area and a plurality of BSs having a common IP broadcast address. The system includes an IP network connecting the BSs to the MSC, means in the MSC for broadcasting an IP page message to the common IP broadcast address, and at least one UDP port in each of the BSs dedicated to receiving the page message from the MSC. A first UDP port may be dedicated to receiving page messages directed to a location area with which the BS is associated. A second UDP port may be dedicated to receiving page messages directed to a location area group with which the BS is associated. A third UDP port may be dedicated to receiving page messages directed to the network service area.

In yet another aspect, the present invention is an IP Base Station (BS) in a cellular telecommunications network having an MSC serving a network service area. The BS includes a first UDP port that receives only page messages from the MSC directed to a location area with which the BS is associated, a second UDP port that receives only page messages from the MSC directed to a location area group with which the BS is associated, and a third UDP port that receives only page messages from the MSC directed to the network service area. The BS also includes means for paging a mobile station in response to receiving a page message from the MSC through the first, second, or third UDP port.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In networks that communicate between nodes utilizing the Internet Protocol (IP), message data is divided into a plurality of data packets, each having an identifying header that includes a source and destination address for the packet. The packets are then transmitted from the source to the destination through a plurality of routers in a connectionless packet-switched network. Additionally, the packets may be addressed to a plurality of destinations, and the packets are accordingly routed to each of the destinations. A broadcast-based network (such as Ethernet) has a broadcast address. A packet can be transmitted to this address, and it will be picked up by every host on the network.

In the context of a cellular telecommunications network, control messages may be sent from an MSC to an IP-based BS over such a packet-switched network. By addressing the packets to a plurality of BSs, the MSC can send, for example, a page message to a plurality of BSs by sending a single IP message with a plurality of destination addresses. If the page message is sent to a broadcast address, then every BS in the network will receive the message.

To the IP network, message traffic is sent, either directly or via routers or otherwise, from the MSC to a plurality of Network Interfaces (NIs), which, as their name implies, act to interface layers on the network. Each NI is associated with a BS. Each BS contains a plurality of User Datagram Protocol (UDP) ports. These ports are said to "listen" for message traffic directed to that particular port. Once a given BS identifies message traffic as being directed to it, or to a MS associated with that BS, the BS takes appropriate action in response to the message received. This may include transmitting message traffic or control messages to the associated MS or a plurality of MSs within the BS's coverage cell.

Figure 1:
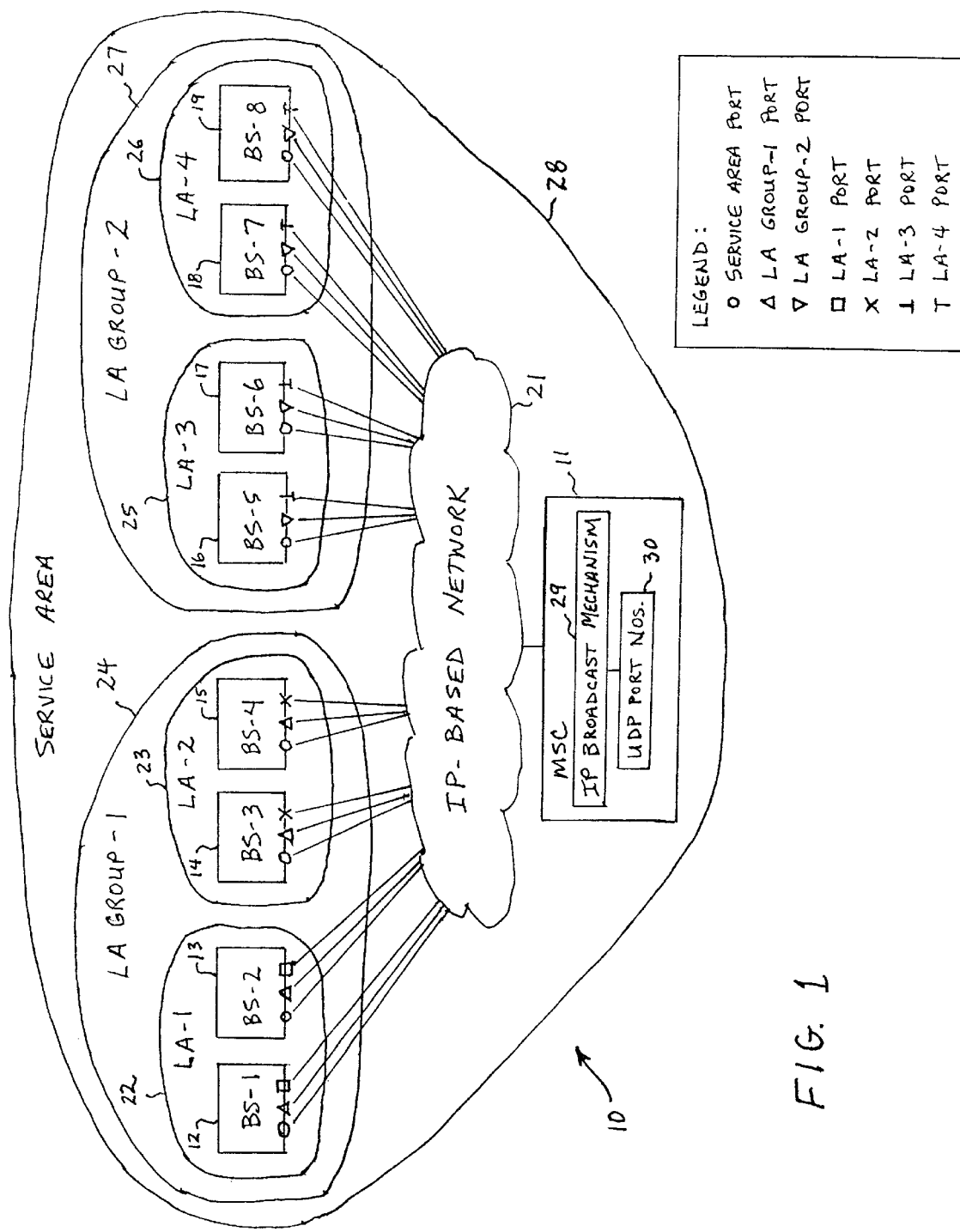
FIG. 1 is a simplified block diagram of the preferred embodiment of the system of the present invention.

FIG. 1 is a simplified block diagram of the preferred embodiment of the system of the present invention. Within a cellular telecommunications network 10, an MSC 11 is connected to a plurality of Base Stations (BSs) 12–19 through an IP-based network 21. BS-1 12 and BS-2 13 are shown to be associated with Location Area-1 (LA-1) 22. Likewise, BS-3 14 and BS-4 15 are shown to be associated with Location Area-2 (LA-2) 23. LA-1 and LA-2, in turn, are shown to be associated with Location Area Group-1 (LA Group-1) 24. In similar fashion, BS-5 16 and BS-6 17 are shown to be associated with Location Area-3 (LA-3) 25. Likewise, BS-7 18 and BS-8 19 are shown to be associated with Location Area-4 (LA-4) 26. LA-3 and LA-4, in turn, are shown to be associated with Location Area Group-2 (LA Group-2) 27. The MSC and all BSs are located within the service area 28.

According to the invention, all BSs within the service area are assigned a common IP broadcast address that can be used by the MSC for broadcasting paging messages to the Base Stations. As noted above, each Base Station to which the invention applies contains UDP ports that "listen" for page messages from the MSC. Port numbers range from 1 to 65535, with 1 through 1023 being reserved for system applications. The present invention, rather than permitting these UDP ports to listen for page messages without regard to destination for those page messages, takes three UDP ports in each BS and "assigns" or "dedicates" these three ports to listen for particular, well-defined, broadcast page messages. This port dedication may be accomplished through the use of specific hardware devices, software methods, or both within each of the plurality of BSs.

The MSC 11 includes an IP broadcast mechanism 29 that broadcasts page messages over the IP-based network 21 to the BSs. The broadcast mechanism places a unique UDP port number 30 in the address header, depending on whether the page message is intended for all of the BSs in a particular LA, LA Group, or the service area.

As described above, in a typical paging scenario in which an interrogating MSC requests a routing number from a serving MSC, the serving MSC first pages the MS in a location area, a plurality of cells surrounding the last known location of the MS. If the MS is not found in the location area, the search is expanded to a location area group, a plurality of location areas. Finally, if the MS is not found there, the MS is paged throughout the entire service area of the network. Each BS in the network is associated with one location area, one location area group, and, by default, to the service area. The number of location areas and location area groups may vary from manufacturer to manufacturer, but there may typically be up to 32 location areas and 16 location area groups.

The BSs listen for broadcast page messages on UDP ports associated with each paging area. The present invention dedicates one of the three assigned ports in each BS to listen for broadcast page messages directed to a location area; another port listens for broadcast page messages directed to a location area group; and the third port listens for broadcast page messages directed to the network service area.

Accordingly, each BS is assigned a unique port number on which to receive page messages directed to every BS in the network service area. For example, port number 10000 may be utilized for this purpose. In FIG. 1, this port is represented by a circle, and every BS in the service area 28 listens to port 10000 for page messages. Each BS is also assigned a unique port number on which to receive page messages directed to every BS in the BS's associated LA. For example, port numbers 10001 through 10004 may be utilized for LA-1 through LA-4, respectively. In a network having, for example 32 LAs, port numbers 10001 through 10032 may be utilized. In FIG. 1, the port for LA-1 is represented by a square, and every BS in LA-1 listens to this port; LA-2 is represented by an X, and every BS in LA-2 listens to this port; LA-3 is represented by a ⊥, and every BS in LA-3 listens to this port; and LA-4 is represented by a ⊤, and every BS in LA-4 listens to this port.

Similarly, each BS is also assigned a unique port number on which to receive page messages directed to every BS in the BS's associated LA Group. For example, port numbers 10101 and 10102 may be utilized for LA Group-1 and LA Group-2, respectively. In a network having, for example 16 LA Groups, port numbers 10101 through 10116 may be utilized. In FIG. 1, the port for LA Group-1 is represented by a Δ, and every BS in LA Group-1 listens to this port. LA Group-2 is represented by a ∇, and every BS in LA Group-2 listens to this port.

In summary, if port numbers starting at 10000 are considered, each base station may listen to paging broadcast messages on the following ports:

| Port Number | Purpose |
| --- | --- |
| 10000 | service area port for paging |
| 10000 + location area ID | location area port for paging |
| 10100 + location area group ID | location area group port for paging. |

Therefore, a BS belonging to location area 24 and location area group 7 listens to ports 10000, 10024, and 10107.

The number of BSs, LAs, and LA Groups illustrated in FIG. 1 is exemplary only, and in reality may be larger or smaller than illustrated. In addition, the port numbers are also exemplary, and different numbers may be assigned as long as the numbers for each LA, LA Group, and service area are unique.

Figure 2A:
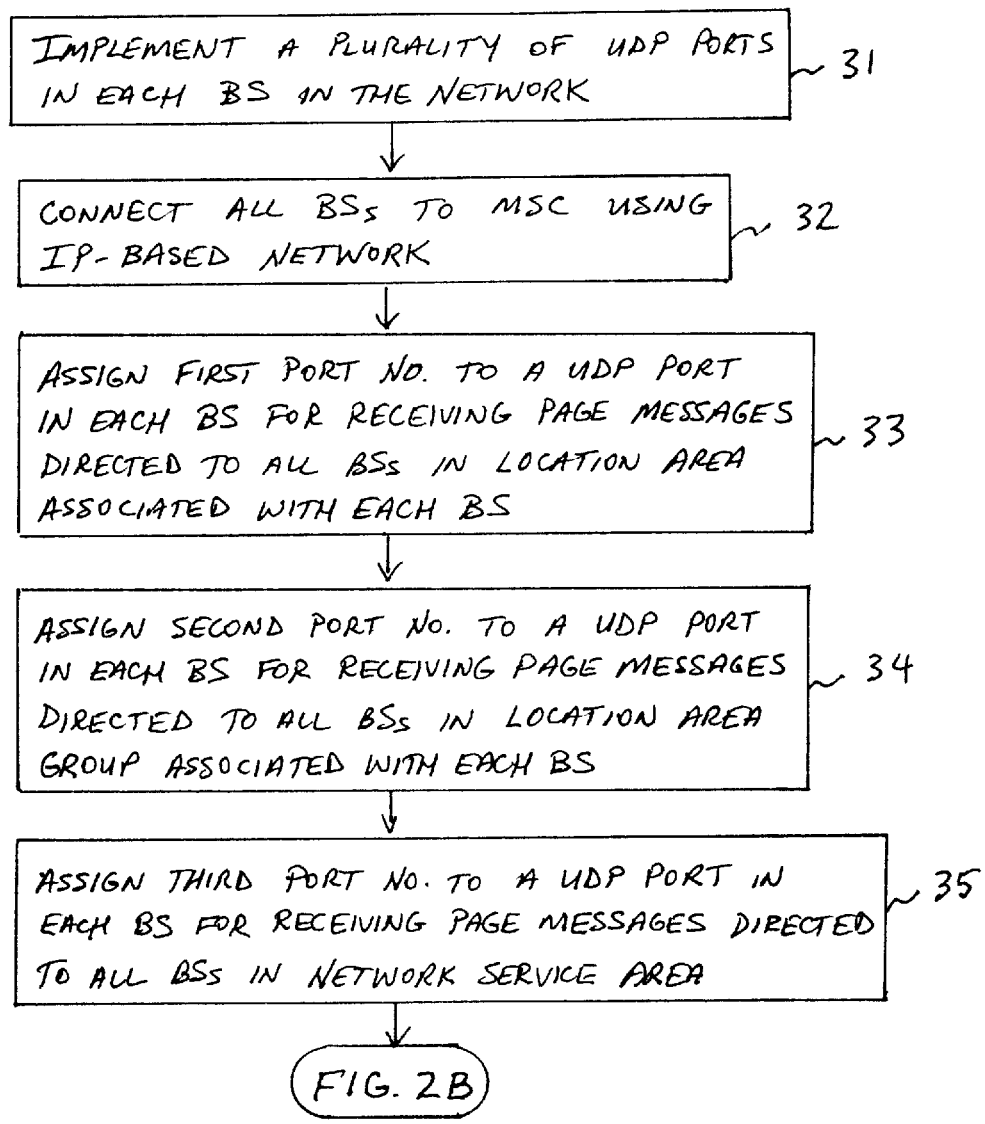
FIGS. 2A–2B are a flow chart illustrating the steps of the preferred embodiment of the method of the present invention.
Figure 2B:
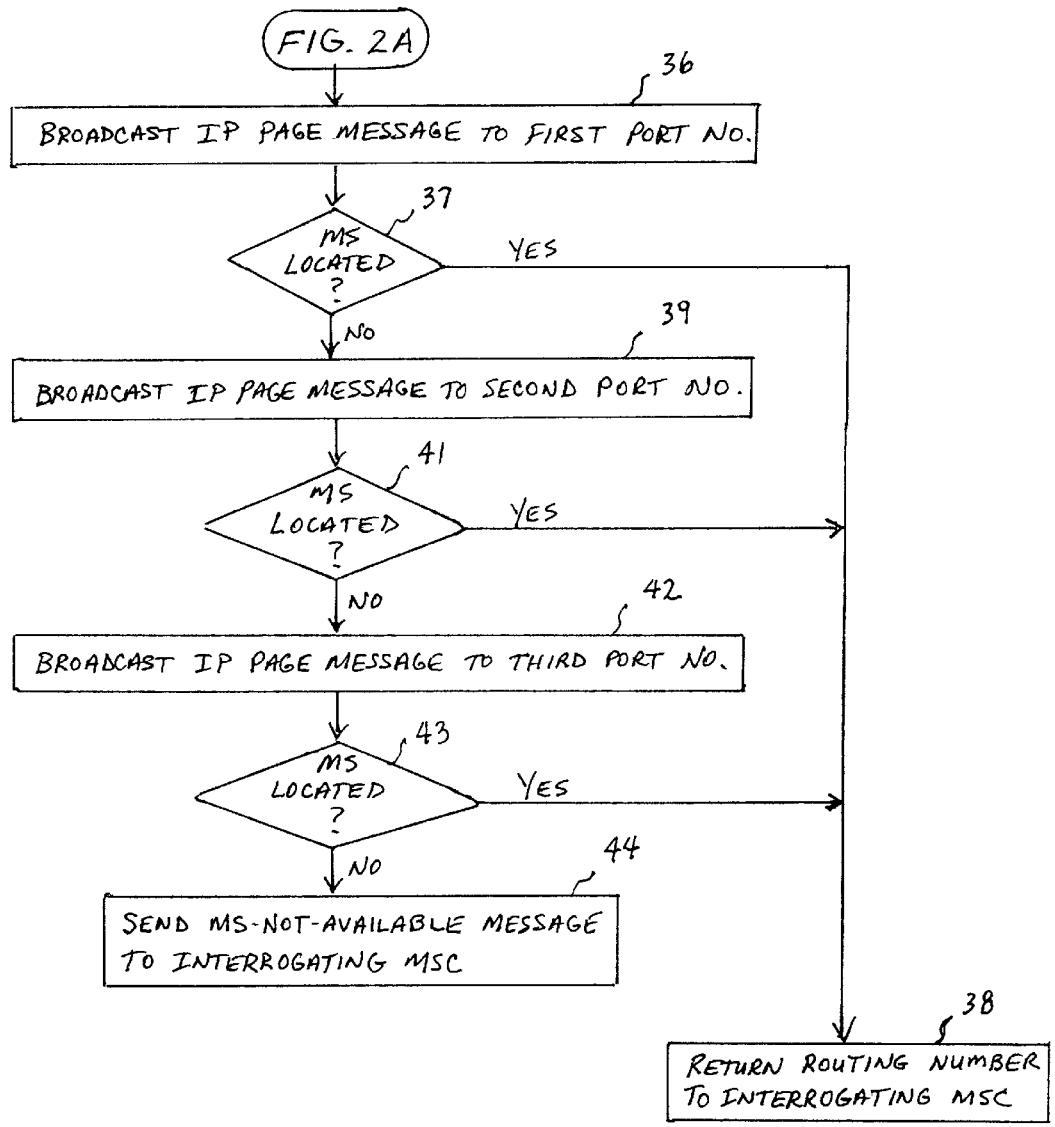

FIGS. 2A–2B are a flow chart illustrating the steps of the preferred embodiment of the method of the present invention. Referring first to FIGS. 1 and 2A, the method will now be described. At step 31, a plurality of UDP ports are implemented in each BS in the network. At step 32, all of the BSs are connected to the MSC 11 through an IP-based network 21. In each BS, a first UDP port is assigned at step 33 to receive page messages directed to the location area associated with the particular BS. At step 34, a second UDP port in each BS is assigned to listen for page messages sent to the location area group associated with the BS. At step 35, a third UDP port in each BS is assigned to listen for page message sent to the entire service area. The method then moves to FIG. 2B.

At step 36, the serving MSC being interrogated for a routing number sends a broadcast IP page message to the BSs in the location area where the MS was last located. When an MS location area is paged, the MSC sends a single page message to the broadcast IP address of the network. In addition to the IP broadcast address, the message contains the first UDP port number (i.e., the destination UDP port number for that LA). The packet is directed to the port number for the location area (for example, 10002 for LA-2), and only BSs listening on port 10002 receive the message. At step 37, it is then determined whether or not the MS was located by the page attempt at the LA level (i.e., whether or not a response was received from the MS). If so, the method moves to step 38 where the serving MSC returns a routing number to the interrogating MSC.

If the MS was not located at step 37, the method moves to step 39 where the serving MSC sends a broadcast IP page message to the LA Group associated with the LA where the MS was last located. When the MSC pages an LA Group, the MSC includes the second UDP port number (i.e., the destination UDP port number for the associated LA Group) in the broadcast message. The packet is directed to the port number for the LA Group (for example, 10101 for LA Group-1), and only BSs listening on port 10101 receive the message. At step 41, it is then determined whether or not the MS was located by the page attempt at the LA Group level. If so, the method moves to step 38 where the serving MSC returns a routing number to the interrogating MSC. If not, the method moves to step 42 where the serving MSC sends a broadcast IP page message to the service area of the network. When the MSC pages an LA Group, the MSC includes the third UDP number (i.e., the destination UDP port number for the service area) in the broadcast message. The packet is directed to the port number for the service area (for example, 10000), and all BSs listening on port 10000 receive the message. At step 43, it is then determined whether or not the MS was located by the page attempt at the service area level. If so, the method moves to step 38 where the serving MSC returns a routing number to the interrogating MSC. If not, the method moves to step 44 where the serving MSC returns an indication to the interrogating MSC that the MS is not available.

Thus, the invention greatly reduces the signaling required for paging a high number of base stations by using only one broadcast message for each location area, one broadcast message for each location area group, and one broadcast message for the entire service area.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of paging mobile stations in a cellular telecommunications network having a Mobile Switching Center (MSC), a plurality of Base Stations (BSs) in a network service area, and an Internet Protocol (IP) network connecting the BSs to the MSC, said method comprising the steps of:

assigning a common IP broadcast address to all of the BSs in the service area;

broadcasting an IP page message to the common IP broadcast address; and dedicating at least one User Datagram Protocol (UDP) port in each of the BSs to receive the page message from the MSC.

2. The method of claim 1 wherein the step of dedicating at least one UDP port in each of the BSs includes dedicating a first UDP port to receive page messages directed to a location area with which the BS is associated.

3. The method of claim 2 wherein the step of dedicating a first UDP port to receive page messages directed to a location area includes assigning each BS a first unique port number on which to receive page messages being sent to all BSs in each BS's associated location area.

4. The method of claim 3 wherein the step of dedicating at least one UDP port in each of the BSs includes dedicating a second UDP port to receive page messages directed to a location area group with which the BS is associated.

5. The method of claim 4 wherein the step of dedicating a second UDP port to receive page messages directed to a location area group includes assigning each BS a second unique port number on which to receive page messages being sent to all BSs in each BS's associated location area group.

6. The method of claim 5 wherein the step of dedicating at least one UDP port in each of the BSs includes dedicating a third UDP port to receive page messages directed to the network service area.

7. The method of claim 6 wherein the step of dedicating a third UDP port to receive page messages directed to the network service area includes assigning each BS a third unique port number on which to receive page messages being sent to all BSs in the network service area.

8. The method of claim 7 wherein the step of broadcasting an IP page message to the common IP broadcast address includes the steps of:

broadcasting an IP page message that is addressed to the first port number when the page message is being sent to all BSs in the associated location area;

broadcasting an IP page message that is addressed to the second port number when the page message is being sent to all BSs in the associated location area group; and broadcasting an IP page message that is addressed to the third port number when the page message is being sent to all BSs in the network service area.

9. The method of claim 8 wherein the third port number is 10000, the second port number is a number in the range of 10001 to 10032, and the third port number is a number in the range of 10101 to 10116.

10. The method of claim 1 wherein the step of dedicating at least one UDP port in each of the BSs to receive the page message includes utilizing a hardware device to dedicate the port.

11. The method of claim 1 wherein the step of dedicating at least one UDP port in each of the BSs to receive the page message includes utilizing a software method to dedicate the port.

12. A system for paging mobile stations in a cellular telecommunications network having a Mobile Switching Center (MSC) serving a network service area and a plurality of Base Stations (BSs) having a common Internet Protocol (IP) broadcast address, said system comprising:

an IP network connecting the BSs to the MSC;

means in the MSC for broadcasting an IP page message to the common IP broadcast address; and at least one User Datagram Protocol (UDP) port in each of the BSs dedicated to receiving the page message from the MSC.

13. The system of claim 12 wherein the at least one UDP port includes a first UDP port dedicated to receiving page messages directed to a location area with which the BS is associated.

14. The system of claim 13 wherein the at least one UDP port also includes a second UDP port dedicated to receiving page messages directed to a location area group with which the BS is associated.

15. The system of claim 14 wherein the at least one UDP port also includes a third UDP port dedicated to receiving page messages directed to the network service area.

16. The system of claim 15 wherein the means within the MSC for broadcasting an IP page message includes:

means for broadcasting the IP page message to the first UDP port when the page message is being sent to all BSs in the associated location area;

means for broadcasting the IP page message to the second UDP port when the page message is being sent to all BSs in the associated location area group; and means for broadcasting the IP page message to the third UDP port when the page message is being sent to all BSs in the network service area.

17. An Internet Protocol (IP) Base Station (BS) in a cellular telecommunications network having a Mobile Switching Center (MSC) serving a network service area, said BS comprising:

a first User Datagram Protocol (UDP) port that receives only page messages from the MSC directed to a location area with which the BS is associated;

a second UDP port that receives only page messages from the MSC directed to a location area group with which the BS is associated;

a third UDP port that receives only page messages from the MSC directed to the network service area; and means for paging a mobile station in response to receiving a page message from the MSC through the first, second, or third UDP port.

* * * * *